United States Patent
Zhang et al.

(10) Patent No.: US 12,475,914 B2
(45) Date of Patent: Nov. 18, 2025

(54) CONDITIONAL FACTORIZATION FOR JOINTLY MODELING CODE-SWITCHED AND MONOLINGUAL ASR

(71) Applicant: TENCENT AMERICA LLC, Palo Alto, CA (US)

(72) Inventors: Chunlei Zhang, Bellevue, WA (US); Brian Yan, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 362 days.

(21) Appl. No.: 17/828,240

(22) Filed: May 31, 2022

(65) Prior Publication Data

US 2023/0386507 A1    Nov. 30, 2023

(51) Int. Cl.
G10L 25/78  (2013.01)
G06N 3/045  (2023.01)
G10L 15/00  (2013.01)
G10L 25/30  (2013.01)

(52) U.S. Cl.
CPC ............ *G10L 25/78* (2013.01); *G06N 3/045* (2023.01); *G10L 15/005* (2013.01); *G10L 25/30* (2013.01)

(58) Field of Classification Search
USPC ............... 704/246, 247, 251, 252, 256, 275
See application file for complete search history.

(56) References Cited

U.S. PATENT DOCUMENTS

| 10,559,225 | B1 | 2/2020 | Tao et al. |
| 10,964,309 | B2 | 3/2021 | Li et al. |
| 11,798,534 | B2 * | 10/2023 | Wang .................. G10L 15/16 |
| 2019/0189111 | A1 * | 6/2019 | Watanabe ............ G10L 15/16 |
| 2020/0160836 | A1 * | 5/2020 | Chen .................. G10L 15/16 |
| 2021/0319181 | A1 * | 10/2021 | Meng .................. G06N 3/045 |

OTHER PUBLICATIONS

Wang et al. Deep Fcatorization for speech signal, Jun. 25, 2017.*
Yu et al. factorization deep neural networks for adaptive speech recognition, 2012.*

(Continued)

*Primary Examiner* — Leonard Saint-Cyr
(74) *Attorney, Agent, or Firm* — Sughrue Mion, PLLC (57) ABSTRACT

A method, apparatus, and non-transitory computer-readable medium for automatic speech recognition using conditional factorization for bilingual code-switched and monolingual speech may include receiving an audio observation sequence comprising a plurality of frames, the audio observation sequence including audio in a first language or a second language. The approach may further include mapping the audio observation sequence into a first sequence of hidden representations, the mapping being generated by a first encoder corresponding to the first language and mapping the audio observation sequence into a second sequence of hidden representations, the mapping being generated by a second encoder corresponding to the second language. The approach may further include generating a label-to-frame sequence based on the first sequence of hidden representations and the second sequence of hidden representations, using a joint neural network based model.

17 Claims, 4 Drawing Sheets

(56) References Cited

OTHER PUBLICATIONS

Brian Yan et al., "Joint Modeling of Code-Switched and Monolingual ASR via Conditional Factorization" Nov. 29, 2021, Retrieved from the Internet: https://arxiv.org/pdf/2111.15016.pdf (5 pages total).

International Search Report dated Jan. 10, 2023 issued by the International Searching Authority in Application No. PCT/US22/43312.

Written Opinion dated Jan. 10, 2023 issued by the International Searching Authority in Application No. PCT/US22/43312.

* cited by examiner

CONDITIONAL FACTORIZATION FOR JOINTLY MODELING CODE-SWITCHED AND MONOLINGUAL ASR

FIELD

Embodiments of the present disclosure are directed to the field of automatic speech recognition. More particularly, embodiments of the present disclosure are directed to the field of automatic speech recognition in context of bilingual speech recognition and code-switched speech recognition.

BACKGROUND

Automatic speech recognition (ASR) systems are directed to recognizing spoken words. While a large swathe of ASR systems are directed to monolingual speech, ASR systems with simultaneous bilingual support have received increasing attention as bilingual speech is one of most common communication scenarios. The ASR systems that provide bilingual support for bilingual speech, they rarely account for intra-sequential code switching. Since bilingual speakers often seamlessly code-switch between the different languages they speak, ASR systems that recognize speech including intra-sentential code-switching are needed.

Related works have adapted large-scale multilingual models to more flexibly identify language switch points, but performance of these systems is dependent on the cross-lingual dynamics of the selected languages. Understanding cross-lingual dynamics of the selected languages is often a difficult and resource intensive endeavor. Related works have also attempted to directly optimize the ARS system to intra-sentential code-switching ( ) for a particular bilingual pair. These systems are often tied to the specific bilingual pair and do not generalize to other language pairs. An approach applied in related art is ameliorating the linguistic differences between two unrelated languages by explicitly defining cross-lingual phone-merging rules or by implicitly learning latent language identity representations, or ameliorating the scarcity of paired code-switching speech data through data efficient methods that incorporate monolingual data into both acoustic and language modeling as well as through data augmentation techniques that generate synthetic code-switching data. Thus, ASR systems in related art either do not cover bilingual scenarios, especially intra-sentential code switching scenarios, or they focus narrowly on bilingual scenarios between specific language sets, becoming harder to generalize and failing to perform adequately in monolingual scenarios.

Therefore, ASR systems are needed that perform well in monolingual scenarios, and bilingual scenarios, especially intra-sentential code-switching, while being less resource intensive.

SUMMARY

The present disclosure addresses one or more technical problems. In order to broadly cover bilingual speech, automatic speech recognition ASR) systems need to recognize not only monolingual utterances (from one language or multiple languages) but also intra-sentential code-switched (CS) utterances where both languages are present. Embodiments of the present disclosure may be directed to conversational bilingual ASR systems that can cover both monolingual and intra-sentential CS scenarios.

According to embodiments of the present disclosure, a method for automatic speech recognition using conditional factorization for bilingual code-switched and monolingual speech may be provided. The method may be executed by one or more processors, and the method may include receiving an audio observation sequence comprising a plurality of frames, the audio observation sequence including audio in a first language or a second language; mapping the audio observation sequence into a first sequence of hidden representations, the mapping being generated by a first encoder corresponding to the first language; mapping the audio observation sequence into a second sequence of hidden representations, the mapping being generated by a second encoder corresponding to the second language; and generating a label-to-frame sequence based on the first sequence of hidden representations and the second sequence of hidden representations, using a joint neural network based model.

According to embodiments of the present disclosure, an apparatus for automatic speech recognition using conditional factorization for bilingual code-switched and monolingual speech may be provided. The apparatus may include at least one memory configured to store program code; and at least one processor configured to read the program code and operate a instructed by the program code. The program code may include first receiving code configured to cause the at least one processor to receive an audio observation sequence comprising a plurality of frames, the audio observation sequence including audio in a first language or a second language; first mapping code configured to cause the at least one processor to map the audio observation sequence into a first sequence of hidden representations, the mapping being generated by a first encoder corresponding to the first language; second mapping code configured to cause the at least one processor to map the audio observation sequence into a second sequence of hidden representations, the mapping being generated by a second encoder corresponding to the second language; and first generating code configured to cause the at least one processor to generate a label-to-frame sequence based on the first sequence of hidden representations and the second sequence of hidden representations, using a joint neural network based model.

According to embodiments of the present disclosure, a non-transitory computer-readable medium storing one or more instructions may be provided. The one or more instructions, when executed by one or more processors of a device for automatic speech recognition using conditional factorization for bilingual code-switched and monolingual speech, may cause the one or more processors to receive an audio observation sequence comprising a plurality of frames, the audio observation sequence including audio in a first language or a second language; map the audio observation sequence into a first sequence of hidden representations, the mapping being generated by a first encoder corresponding to the first language; map the audio observation sequence into a second sequence of hidden representations, the mapping being generated by a second encoder corresponding to the second language; and generate a label-to-frame sequence based on the first sequence of hidden representations and the second sequence of hidden representations, using a joint neural network based model.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Embodiments of the present disclosure is directed to recognizing not only monolingual utterances from two different languages, but also intra-sentential code-switched (CS) utterances where both languages are present. More specifically, embodiments of the present disclosure are directed to end-to-end ASR system to (i) recognize both monolingual and intra-sentential CS utterances, and (ii) efficiently leverage monolingual and CS ASR training data.

According to embodiments of the present disclosure, the bilingual ASR problem may be modeled as a joint model of monolingual and CS ASR where the final output may be obtained given only monolingual label-to-frame synchronized information. An end-to-end differentiable neural network, e.g., conditional recurrent neural network transducer (RNN-T) may be applied to model the conditional joint formulation.

Embodiments of the present disclosure resolve the generalization problem of CS/bilingual speech recognition system without relying on explicitly language identification. The conditional factorization scheme provides a general solution for multi-lingual ASR with extendable new languages. With the proposed inventions, the ASR system can achieve state-of-the-art code-switch speech recognition accuracy while remaining a strong monolingual ASR performance. Therefore, it can be widely applied to speech recognition systems with multi-lingual inputs. E.g., a Conditional RNN-T model may be efficient in both monolingual and CS scenarios compared to models in related art, and demonstrates that given monolingual label-to-frame information, no other information from the observation is required.

According to an embodiment of the represent disclosure, instead of treating ASR in bilingual speech as a single transduction task, it may be decomposed into three portions: (i) recognizing a first language (e.g., mandarin), (ii) recognizing a second language (e.g., English), and (iii) composing the recognized monolingual segments into a bilingual sequence which may or may not be CS.

Figure 1:
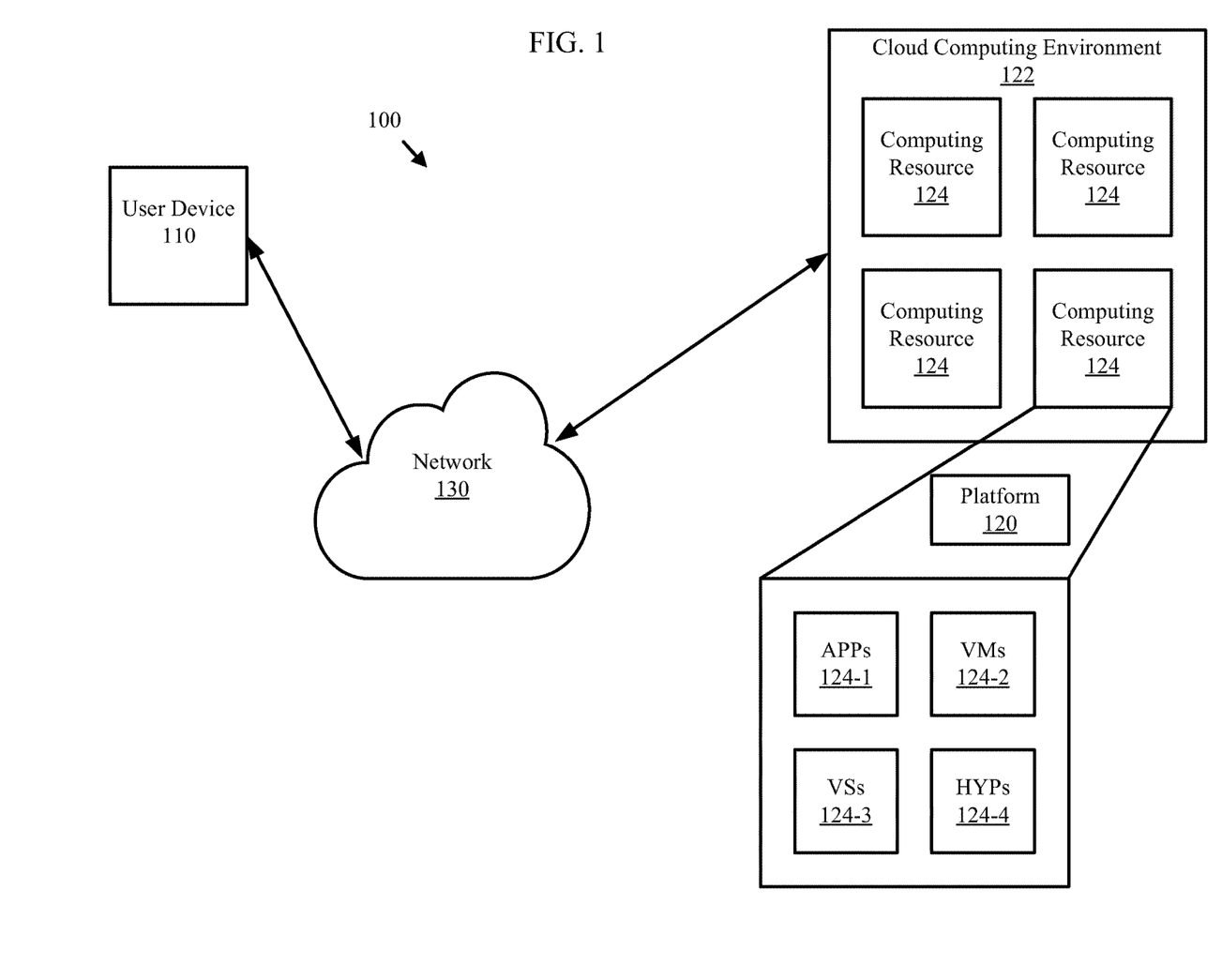
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
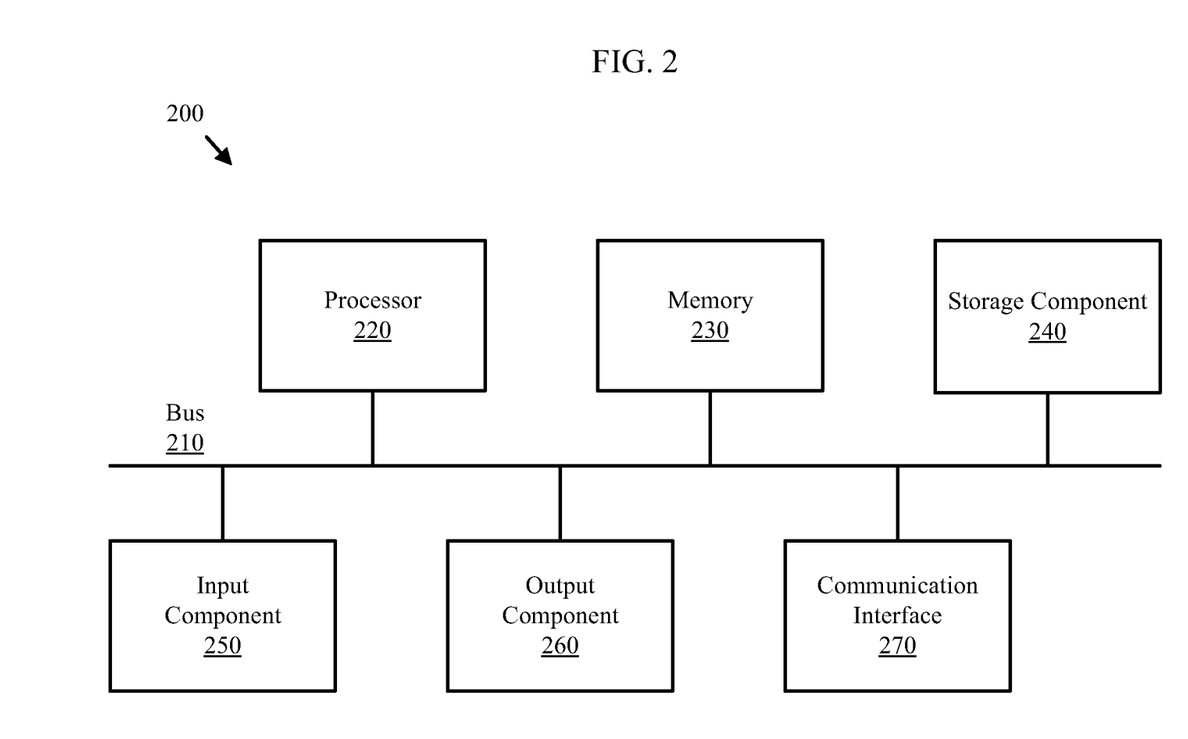
FIG. 2 is a block diagram of example components of one or more devices of FIG.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
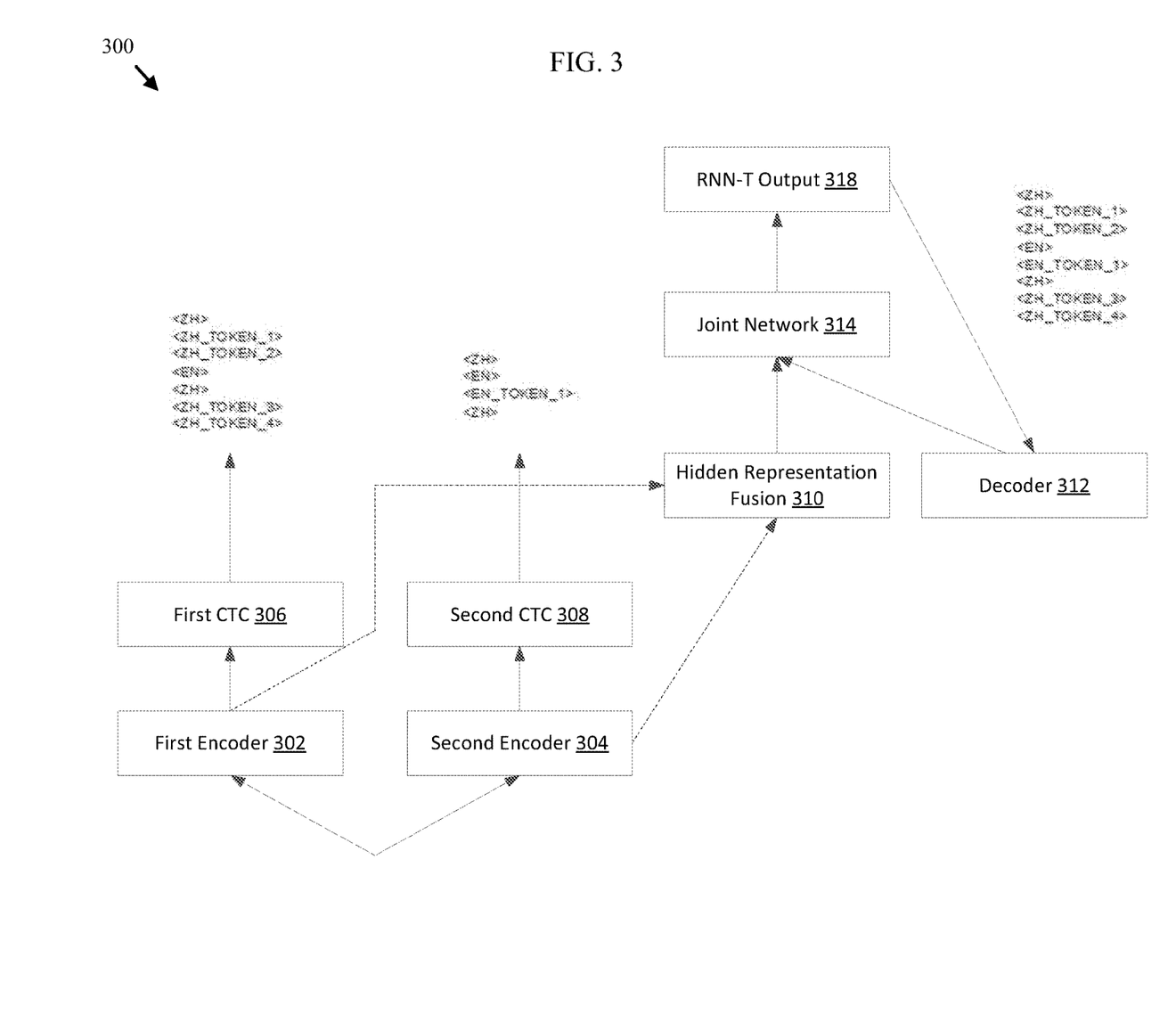
FIG. 3 is a simplified illustration of an exemplary automatic speech recognition system using conditional factorization for bilingual code-switched and monolingual speech, according to the embodiments of the disclosure.

FIG. 3 illustrates an exemplary ASR system 300 for automatic speech recognition system using conditional factorization for bilingual code-switched and monolingual speech. As shown in FIG. 3, the ASR system 300 may include a first encoder 302, a first Connectionist Temporal Classification (CTC) 306, a second encoder 304, a second CTC 308, a hidden representation fusion module/mechanism 310, a decoder 312, a joint network 314, and a RNN-T output 318.

Embodiments of the present disclosure may include an audio stream being input into a first language encoder and a second language encoder. In some embodiments the audio stream may be input into the first encoder and the second encoder in parallel. In some embodiments the audio stream may be input into the first encoder and the second encoder in a specific order. The first encoder and the second encoder may be trained with a convolutions-through-time (CTT) loss and language separation labels.

According to an embodiment, bilingual ASR with CS may be a sequence mapping from a T-length audio observation sequence $X=\{x_t \in R^D | t=1 \ldots T\}$ to an L-length label sequence $Y=\{y_t \in (V^M \cup V^E) | n=1 \ldots L\}$ consisting of first language $V^M$ (e.g., Mandarin) and second language $V^E$ (e.g., English). For the audio observation sequence X of length T and a bilingual label sequence Y of length L, there may be a number of possible T length label-to-frame sequences $Z=\{z_t \in V^M \cup V^E \cup \{\varnothing\} | t=1 \ldots T\}$, where $z_t$ may be a surface-level unit or a blank symbol denoting a null emission as in Connectionist Temporal Classification (CTC).

Given an audio observation sequence X the first encoder 302 associated with a first language may map the audio observation sequence to a first sequence of hidden representations (intermediate latent representations) $h^M=\{h_t^M \in R^D | t=1 \ldots T\}$. The second encoder 304 associated with a second language may map the audio observation sequence to a second sequence of hidden representations $h^E=\{h_t^E \in R^D | t=1 \ldots T\}$. Separate linear projection layers followed by softmax activations may yield posterior probabilities for each encoder. According to embodiments, the first encoder 302 and the second encoder 304 may be trained using any suitable CTC loss functions.

As an example, for a first language Mandarin and a second language English, the first encoder and the second encoder may be defined as follows:

$$h_t^M = \text{Encoder}_M(x_{1:T}) \quad \text{Equation 1}$$

$$h_t^E = \text{Encoder}_E(x_{1:T}) \quad \text{Equation 2}$$

$$P(z_t^M|x) = \text{SoftmaxOut}_M(h_t^M) \quad \text{Equation 3}$$

$$P(z_t^E|x) = \text{SoftmaxOut}_E(h_t^E) \quad \text{Equation 4}$$

$$L_M = \text{CTCLoss}(z^M, y^M) \quad \text{Equation 5}$$

$$L_E = \text{CTCLoss}(z^E, y^E) \quad \text{Equation 6}$$

According to embodiments, the first sequence of hidden representations generated by the first encoder 302 and the second sequence of hidden representations generated by the second encoder 304 may be transmitted for fusion to hidden representation fusion 310. The fused sequence of hidden representations may provide monolingual alignment of the speech in the audio observation sequence. In some embodiments, the first sequence of hidden representations and the second sequence of hidden representations may be fused using an addition operation by hidden representation fusion 310. The operation used may be different based on a goal of the task. The monolingual alignment information (e.g., fused sequence of hidden representations) may be passed to the joint network 314 (e.g., conditional RNN-T model), and the joint network may be trained using the fused sequence of hidden representations and previously generated label-to-frame sequences decoded using the decoder 312. The RNN-T Output 318 may be used as a final linear projection layers followed by softmax activations to yield the posterior $P(z_i|h^M, h^E, z_{1:i-1})$. The training of the joint network, for both CS and monolingual utterances may be represented using the following equations.

$$h_t^{ENC} = h_t^M + h_t^E \quad \text{Equation 7}$$

$$h_l^{DEC} = \text{DECODER}(z_{1:l-1}) \quad \text{Equation 8}$$

$$h_{t,l}^{JOINT} = \text{JOINT}(h_t^{ENC}, h_l^{DEC}) \quad \text{Equation 9}$$

$$P(z_i|h^M, h^E, z_{1:i-1}) = \text{SOFTMAX}(h_{t,l}^{JNT}) \quad \text{Equation 10}$$

$$L_{cs} = \text{RNNTLoss}(z, y) \quad \text{Equation 11}$$

According to embodiments of the present disclosure, the training of the joint network 314 may include using the hidden representation fusion 310, a conditional recurrent neural network model at the joint network 314, a decoder 312 to decode the previously generated label-to-frame sequences for loss calculation and backpropagation, and RNN-T Output 318 for linear projections and activations.

In some embodiments, a language separation loss function associated with the joint network 314 may include a joint loss associated with the joint neural network based model, a first loss associated with the first encoder, and a second loss associated with the second encoder to explicitly account for the different languages.

According to embodiments, the label-to-frame sequence Z may be specified in terms of its monolingual parts, $Z^M$ and $Z^E$, such that at any position t only one of $z_t^M$ or $z_t^E$ may be non-blank. As the joint network models a Conditional RNN-T probability using $p(Z^M|X)$ and $p(Z^E|X)$, each monolingual CTC sub-net may be capable of emitting labels for frames corresponding to their respective language while emitting blanks for frames in the other language. This ability of the joint network in the present disclosure may be known as Language-Separation.

Figure 4:
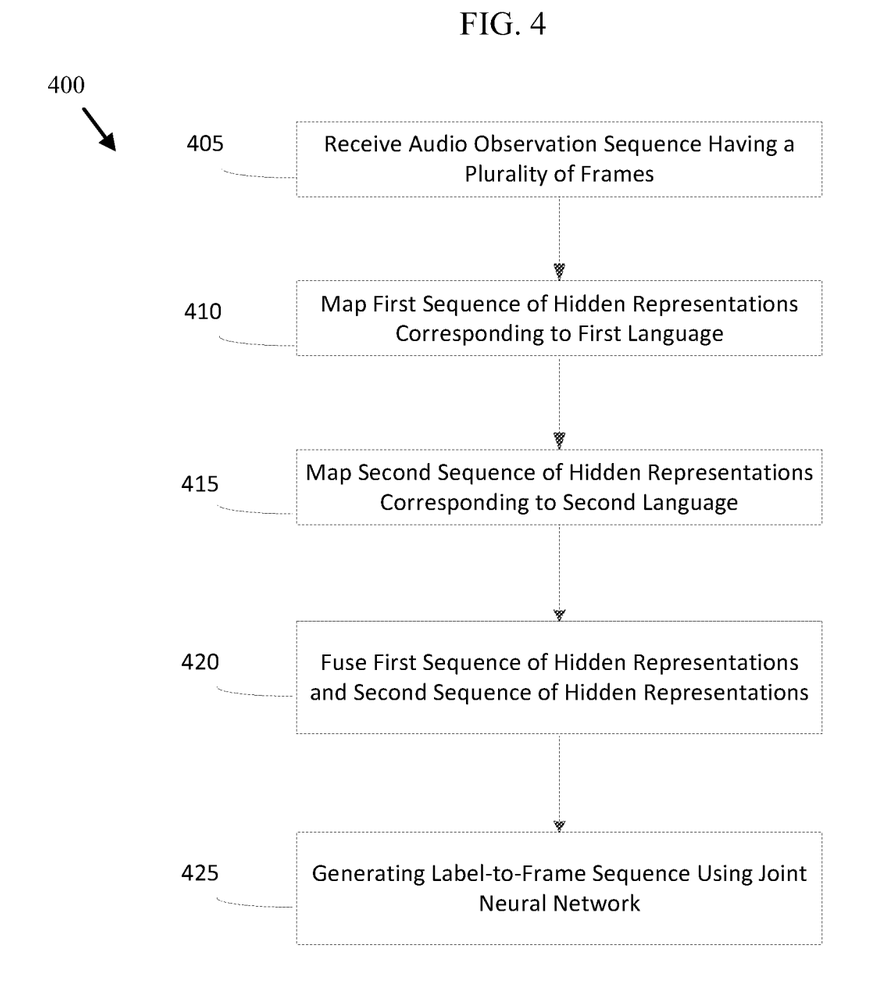
FIG. 4 is a simplified flowchart for automatic speech recognition using conditional factorization for bilingual code-switched and monolingual speech, according to the embodiments of the disclosure.

FIG. 4 illustrates a process 400 for automatic speech recognition using conditional factorization for bilingual code-switched and monolingual speech.

As shown in FIG. 4, at operation 405, an audio observation sequence comprising a plurality of frames may be received. The audio observation sequence may include audio in a first language or a second language, or both, or may include intra-sentential code-switching. As an example, an audio observation sequence including a plurality of frames may be received by a first encoder 302 and a second encoder 304. In some embodiments, the first language may be Mandarin and the second language may be English.

At operation 410, a first sequence of hidden representations may be mapped based on the audio observation sequence, wherein the mapping may be generated by a first encoder corresponding to the first language. As an example, the audio observation sequence may be bilingual speech in Mandarin and English, and may be mapped by a first encoder 302 (e.g., Mandarin encoder) into the first sequence of hidden representations. According to some embodiments, the first encoder may be a first pre-trained neural network model trained using a first connectionist temporal classification framework.

According to an embodiment, the first encoder may be configured to generate respective first labels (using e.g., first CTC 306) associated with respective frames of the plurality of frames of the audio observation sequence based on determining that the respective frames of the plurality of frames of the audio observation sequence may be associated with the first language (e.g., Mandarin), and wherein the first encoder may be configured to generate blank labels (using, e.g., first CTC 306) associated with the respective frames of the plurality of frames of the audio observation sequence based on determining that the respective frames of the plurality of frames of the audio observation sequence may not be associated with the first language (e.g., frames of the audio observation sequence may be associated with the second language such as English).

At operation 415, a second sequence of hidden representations may be mapped based on the audio observation sequence, wherein the mapping may be generated by a second encoder corresponding to the second language. As an example, the audio observation sequence may be bilingual speech in Mandarin and English, and may be mapped by a second encoder 304 (e.g., English encoder) into the second sequence of hidden representations. According to embodiments, the second encoder may be a second pre-trained neural network model trained using a second connectionist temporal classification framework.

According to an embodiment, the second encoder may be configured to generate respective second labels (using e.g., second CTC 308) associated with respective frames of the plurality of frames of the audio observation sequence, based on determining that the respective frames of the plurality of frames of the audio observation sequence may be associated with the second language (e.g., English), and wherein the second encoder may be configured to generate blank labels (using e.g., second CTC 308) associated with the respective frames of the plurality of frames of the audio observation sequence based on determining that the respective frames of the plurality of frames of the audio observation sequence may not be associated with the second language (e.g., frames of the audio observation sequence may be associated with the first language such as Mandarin).

At operation 420, the first sequence of hidden representations and the second sequence of hidden representations may be fused to generate a fused sequence of hidden representations. In some embodiments, the fusing may include an addition of the first sequence of hidden representations and the second sequence of hidden representations. As an example, the first sequence of hidden representations generated by first encoder 302 and the second sequence of hidden representations generated by second encoder 304 may be fused by hidden representation fusion 310.

At operation 425, the label-to-frame sequence may be generated using a joint neural network based model. According to some embodiments, the label-to-frame sequence may be generated based on the first sequence of hidden representations and the second sequence of hidden representations using the joint neural network based model. As another example, the label-to-frame sequence may be generated based on the fused sequence of hidden representations using the joint neural network based model.

According to an embodiment, the joint network 314 may be trained using a loss function based on a joint loss associated with the joint neural network based model, a first loss associated with the first encoder, and a second loss associated with the second encoder. As an example, training the joint network 314 may include using a loss function based on the joint network 314, the decoder 312, the hidden representation fusion 310, and the RNN-T Output 318.

According to some embodiments, a label at any position in the label-to-frame sequence may be associated with the first language or the second language, and wherein the label may not be associated with both the first language and the second language. As an example, a label at a position may be only one of $z_t^M$ or $z_t^E$ or may be blank but it may not be both.

Operations 405-425, as disclosed herein may be performed using any of the devices in FIG. 1 and FIG. 2. Further, according to some embodiments, operations 405-425 may be performed using computer program code configured to receive, map, fuse, or generate input/output.

TABLE 1

Results comparing the Conditional RNN-T models to Vanilla and Gating RNN-T baselines on intra-sententially code-switched (CS), monolingual Mandarin, and monolingual English test sets. The upper half shows results whess using only CS data during fine-tuning while the bottom half shows results when using CS + monolingual data during fine-tuning. All models are pre-trained on monolingual data.

| Model Type | Model Name | Pre-trained Encoder(s) | Fine-tuning Data | CODE-SWITCHED MER | CER | WER | MONO-MAN CER | MONO-ENG WER |
|---|---|---|---|---|---|---|---|---|
| Direct | Vanilla RNN-T [21, 24] | ✓ | CS | 12.3 | 9.9 | 34.3 | 17.9 | 81.4 |
| Mixture | Gating RNN T [22, 24] | ✓ | CS | 11.5 | 9.1 | 33.0 | 17.7 | 78.3 |
| Conditional | Our Proposed Model | ✓ | CS | 11.5 | 9.1 | 33.2 | 15.5 | 82.9 |
| Conditional | +Language-Separation (LS) | ✓ | CS | 11.1 | 8.7 | 32.7 | 15.3 | 82.7 |
| Direct | Single RNN-T [21, 24] | ✓ | CS + M | 11.3 | 9.3 | 30.8 | 6.5 | 17.8 |
| Mixture | Gating RNN-T [22, 24] | ✓ | CS + M | 11.2 | 8.8 | 34.7 | 5.7 | 34.6 |
| Conditional | Our Proposed Model | ✓ | CS + M | 10.3 | 8.2 | 29.5 | 5.4 | 16.5 |
| Conditional | +Language-Separation (LS) | ✓ | CS + M | 10.2 | 8.1 | 29.2 | 5.3 | 16.3 |

Table 1. Comparison of Joint Network (Conditional RNN-T) to Models in Related Art As seen in table 1, the CS and monolingual performances of a Conditional RNN-T and Conditional RNN-T+LS model disclosed herein is better than other models in related art. Additionally, the results from table 1 indicate that all models perform significantly better on monolingual sets when using monolingual fine-tuning data, and the monolingual data is indeed supplementing the CS training data. Further, the Language-Separation loss incrementally improves across all sets indicating a benefit to the explicit monolingual conditioning method disclosed herein.

As shown in the bottom half of Table 1, the Gating RNN-T slightly outperforms the Vanilla RNN-T on CS and monolingual Mandarin but is degraded on monolingual English, suggesting that the gating mechanism overly focuses on outputting Mandarin due to the high skew of the CS training data towards Mandarin. The Conditional RNN-T model, with embodiments disclosed herein, outperforms the best baselines consistently across evaluation sets.

The techniques described above, can be implemented as computer software using computer-readable instructions and physically stored in one or more computer-readable media or by a specifically configured one or more hardware processors. For example, FIG. 10 shows a computer system 1000 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of automatic speech recognition using conditional factorization for bilingual code-switched and monolingual speech, the method executed by one or more processors, the method comprising:
   receiving an audio observation sequence comprising a plurality of frames, the audio observation sequence including audio in a first language or a second language;
   mapping the audio observation sequence into a first sequence of hidden representations, the mapping being generated by a first encoder corresponding to the first language, wherein the first encoder is configured to generate respective first labels associated with respective frames of the plurality of frames of the audio observation sequence based on determining that the respective frames of the plurality of frames of the audio observation sequence are associated with the first language, and wherein the first encoder is configured to generate blank labels associated with the respective frames of the plurality of frames of the audio observation sequence based on determining that the respective frames of the plurality of frames of the audio observation sequence are not associated with the first language;
   mapping the audio observation sequence into a second sequence of hidden representations, the mapping being generated by a second encoder corresponding to the second language; and
   generating a label-to-frame sequence based on the first sequence of hidden representations and the second sequence of hidden representations, using a joint neural network based model.

2. The method of claim 1, wherein the generating the label-to-frame sequence comprises:
   fusing the first sequence of hidden representations and the second sequence of hidden representations to generate a fused sequence of hidden representations; and
   generating the label-to-frame sequence based on the fused sequence of hidden representations using the joint neural network based model.

3. The method of claim 1, wherein a label at any position in the label-to-frame sequence is associated with the first language or the second language, and wherein the label is not associated with both the first language and the second language.

4. The method of claim 1, wherein the first encoder is a first pre-trained neural network model trained using a first connectionist temporal classification framework, and wherein the second encoder is a second pre-trained neural network model trained using a second connectionist temporal classification framework.

5. The method of claim 4, wherein the second encoder is configured to generate respective second labels associated with respective frames of the plurality of frames of the audio observation sequence, based on determining that the respective frames of the plurality of frames of the audio observation sequence are associated with the second language, and wherein the second encoder is configured to generate blank labels associated with the respective frames of the plurality of frames of the audio observation sequence based on determining that the respective frames of the plurality of frames of the audio observation sequence are not associated with the second language.

6. The method of claim 1, wherein the joint neural network based model is trained using a loss function based on a joint loss associated with the joint neural network based model, a first loss associated with the first encoder, and a second loss associated with the second encoder.

7. An apparatus for automatic speech recognition using conditional factorization for bilingual code-switched and monolingual speech, the apparatus comprising:
   at least one memory configured to store program code; and
   at least one processor configured to read the program code and operate a instructed by the program code, the program code including:
      first receiving code configured to cause the at least one processor to receive an audio observation sequence comprising a plurality of frames, the audio observation sequence including audio in a first language or a second language;
      first mapping code configured to cause the at least one processor to map the audio observation sequence into a first sequence of hidden representations, the mapping being generated by a first encoder corresponding to the first language, wherein the first encoder is configured to generate respective first labels associated with respective frames of the plurality of frames of the audio observation sequence based on determining that the respective frames of the plurality of frames of the audio observation sequence are associated with the first language, and wherein the first encoder is configured to generate blank labels associated with the respective frames of the plurality of frames of the audio observation sequence based on determining that the respective frames of the plurality of frames of the audio observation sequence are not associated with the first language;

second mapping code configured to cause the at least one processor to map the audio observation sequence into a second sequence of hidden representations, the mapping being generated by a second encoder corresponding to the second language; and first generating code configured to cause the at least one processor to generate a label-to-frame sequence based on the first sequence of hidden representations and the second sequence of hidden representations, using a joint neural network based model.

8. The apparatus of claim 7, wherein the first generating code comprises:

fusing code configured to cause the at least one processor to fuse the first sequence of hidden representations and the second sequence of hidden representations to generate a fused sequence of hidden representations; and second generating code configured to cause the at least one processor to generate the label-to-frame sequence based on the fused sequence of hidden representations using the joint neural network based model.

9. The apparatus of claim 7, wherein a label at any position in the label-to-frame sequence is associated with the first language or the second language, and wherein the label is not associated with both the first language and the second language.

10. The apparatus of claim 7, wherein the first encoder is a first pre-trained neural network model trained using a first connectionist temporal classification framework, and wherein the second encoder is a second pre-trained neural network model trained using a second connectionist temporal classification framework.

11. The apparatus of claim 10, wherein the second encoder is configured to generate respective second labels associated with respective frames of the plurality of frames of the audio observation sequence, based on determining that the respective frames of the plurality of frames of the audio observation sequence are associated with the second language, and wherein the second encoder is configured to generate blank labels associated with the respective frames of the plurality of frames of the audio observation sequence based on determining that the respective frames of the plurality of frames of the audio observation sequence are not associated with the second language.

12. The apparatus of claim 7, wherein the joint neural network based model is trained using a loss function based on a joint loss associated with the joint neural network based model, a first loss associated with the first encoder, and a second loss associated with the second encoder.

13. A non-transitory computer-readable medium storing instructions, the instructions comprising: one or more instructions that, when executed by one or more processors of a device for automatic speech recognition using conditional factorization for bilingual code-switched and monolingual speech, cause the one or more processors to:

receive an audio observation sequence comprising a plurality of frames, the audio observation sequence including audio in a first language or a second language;

map the audio observation sequence into a first sequence of hidden representations, the mapping being generated by a first encoder corresponding to the first language, wherein the first encoder is configured to generate respective first labels associated with respective frames of the plurality of frames of the audio observation sequence based on determining that the respective frames of the plurality of frames of the audio observation sequence are associated with the first language, and wherein the first encoder is configured to generate blank labels associated with the respective frames of the plurality of frames of the audio observation sequence based on determining that the respective frames of the plurality of frames of the audio observation sequence are not associated with the first language;

map the audio observation sequence into a second sequence of hidden representations, the mapping being generated by a second encoder corresponding to the second language; and generate a label-to-frame sequence based on the first sequence of hidden representations and the second sequence of hidden representations, using a joint neural network based model.

14. The non-transitory computer-readable medium of claim 13, wherein the generating the label-to-frame sequence comprises:

fusing the first sequence of hidden representations and the second sequence of hidden representations to generate a fused sequence of hidden representations; and generating the label-to-frame sequence based on the fused sequence of hidden representations using the joint neural network based model.

15. The non-transitory computer-readable medium of claim 13, wherein a label at any position in the label-to-frame sequence is associated with the first language or the second language, and wherein the label is not associated with both the first language and the second language.

16. The non-transitory computer-readable medium of claim 13, wherein the first encoder is a first pre-trained neural network model trained using a first connectionist temporal classification framework, and wherein the second encoder is a second pre-trained neural network model trained using a second connectionist temporal classification framework.

17. The non-transitory computer-readable medium of claim 16, wherein the second encoder is configured to generate respective second labels associated with respective frames of the plurality of frames of the audio observation sequence, based on determining that the respective frames of the plurality of frames of the audio observation sequence are associated with the second language, and wherein the second encoder is configured to generate blank labels associated with the respective frames of the plurality of frames of the audio observation sequence based on determining that the respective frames of the plurality of frames of the audio observation sequence are not associated with the second language.

* * * * *